US009026797B2

United States Patent
Yi

(10) Patent No.: US 9,026,797 B2
(45) Date of Patent: May 5, 2015

(54) SERVER APPARATUS HAVING ONE-TIME SCAN CODE ISSUING FUNCTION, USER TERMINAL HAVING ONE-TIME SCAN CODE RECOGNIZING FUNCTION AND METHOD FOR PROCESSING ONE-TIME SCAN CODE

(71) Applicant: Korea Center.Com Co., Ltd., Seoul (KR)

(72) Inventor: Seong-Noh Yi, Goyang-si (KR)

(73) Assignee: Korea Center.Com Co., Ltd., Seoul (KR)

( * ) Notice: Subject to any disclaimer, the term of this patent is extended or adjusted under 35 U.S.C. 154(b) by 154 days.

(21) Appl. No.: 13/713,373

(22) Filed: Dec. 13, 2012

(65) Prior Publication Data
US 2013/0161394 A1 Jun. 27, 2013

(30) Foreign Application Priority Data
Dec. 21, 2011 (KR) .......................... 10-2011-0139501

(51) Int. Cl.
*G06K 19/06* (2006.01)
*G06K 7/10* (2006.01)
*H04L 9/00* (2006.01)
*H04L 9/08* (2006.01)
*H04L 9/32* (2006.01)

(52) U.S. Cl.
CPC ............ *G06K 19/06037* (2013.01); *G06K 7/10* (2013.01); *G06K 19/06* (2013.01); *G06K 19/06028* (2013.01); *H04L 9/0844* (2013.01); *H04L 9/0869* (2013.01); *H04L 9/3215* (2013.01)

(58) Field of Classification Search
CPC .... G06K 19/06037; G06K 19/06; G06K 7/10
USPC ............ 713/168, 176, 179, 189, 161; 380/44, 380/277; 235/462.1, 494, 435, 462.01; 705/44, 71, 76, 67; 726/5
See application file for complete search history.

(56) References Cited

U.S. PATENT DOCUMENTS

| 8,181,234 | B2 * | 5/2012 | Ishida ............................ 726/7 |
| 2003/0145200 | A1 * | 7/2003 | Eden ............................ 713/161 |
| 2006/0126848 | A1 | 6/2006 | Park et al. |

(Continued)

FOREIGN PATENT DOCUMENTS

| KR | 2002-0066755 | 8/2002 |
| KR | 10-2005-0069949 | 7/2005 |

(Continued)

OTHER PUBLICATIONS

Guenther Starnberger et al, QR-TAN: Secure Mobile Transaction Authentication, pp. 578-583, 2009 International Conference on Availability, Reliability and Security, IEEE, 2009.*

(Continued)

*Primary Examiner* — Shewaye Gelagay
*Assistant Examiner* — Shanto M Abedin
(74) *Attorney, Agent, or Firm* — NSIP Law

(57) ABSTRACT

A server apparatus having a one-time scan code issuing function, a user terminal having a one-time scan code recognizing function, and a method for processing a one-time scan code are provided so as to safely and conveniently transmit one-time information used for key-exchange-scheme-based encryption, using a scan code such as a bar code and a QR code.

20 Claims, 3 Drawing Sheets

(56) References Cited

U.S. PATENT DOCUMENTS

| | | | |
|---|---|---|---|
| 2009/0294539 A1* | 12/2009 | Kim | 235/462.01 |
| 2011/0219427 A1* | 9/2011 | Hito et al. | 726/3 |
| 2012/0308003 A1* | 12/2012 | Mukherjee | 235/380 |
| 2013/0046698 A1* | 2/2013 | Gagerman et al. | 705/71 |
| 2013/0110607 A1* | 5/2013 | Basmajian et al. | 705/14.26 |
| 2013/0111208 A1* | 5/2013 | Sabin et al. | 713/171 |
| 2013/0185210 A1* | 7/2013 | Dodson et al. | 705/44 |

FOREIGN PATENT DOCUMENTS

| | | |
|---|---|---|
| KR | 10-2006-0067800 | 6/2006 |
| KR | 10-2006-0074631 A | 7/2006 |
| KR | 10-2007-0010536 | 1/2007 |

OTHER PUBLICATIONS

Yung-Wei Kao et al, Physical Access Control Based on QR Code, pp. 285-288, 2011 International Conference on Cyber-Enabled Distributed Computing and Knowledge Discovery, IEEE, 2011.*

Jerry Gao et al, A 2D Barcode-Based Mobile Payment System, pp. 320-329, 2009 Third International Conference on Multimedia and Ubiquitous Engineering, IEEE, 2009.*

* cited by examiner

US 9,026,797 B2

SERVER APPARATUS HAVING ONE-TIME SCAN CODE ISSUING FUNCTION, USER TERMINAL HAVING ONE-TIME SCAN CODE RECOGNIZING FUNCTION AND METHOD FOR PROCESSING ONE-TIME SCAN CODE

CROSS-REFERENCE TO RELATED APPLICATION

This application claims the benefit under 35 U.S.C. §119 (a) of Korean Patent Application No. 10-2011-0139501, filed on Dec. 21, 2011, the entire disclosure of which is incorporated herein by reference for all purposes.

BACKGROUND

1. Field

The following description relates to a scan code, such as a bar code and a QR code, and, more particularly, to a server apparatus having a one-time scan code issuing function, a user terminal having a one-time scan code recognizing function and a method for processing a one-time scan code.

2. Description of the Related Art

Korean Patent Laid-Open Publication No. 10-2006-0074631 (Published on Jul. 3, 2006) relates to a bar code reader capable of simply recognizing a bar code with an image sensor. However, a bar code or a QR code of the related arts is used to provide only information about a product having the bar code or QR code therein.

For this reason, efforts have been made to seek a technology for using a bar code or QR code not only to provide information about a product having the bar code or QR code therein, but also to safely and conveniently provide one-time information used for key-exchange-scheme-based encryption.

RELATED ART DOCUMENTS

Patent Documents

1. Korean Patent Laid-Open Publication No. 10-2006-0074631 (Published on Jul. 3, 2006)

SUMMARY

The following description relates to a server apparatus having a one-time scan code issuing function, a user terminal having a one-time scan code recognizing function, and a method for processing a one-time scan code in order to safely and conveniently transmit one-time information used for key-exchange-scheme-based encryption, using a scan code such as a bar code and a QR code.

In one general aspect of the present invention, a server apparatus having a one-time scan code issuing function is provided, and the server include a database configured to store a Private Key (PRK) of each user; an OTK generating unit configured to generate an One Time Key (OTK) with a valid time, and store the generated OTK and valid time information of the OTK; an PBK generating unit configured to generate a one-time Public Key (PBK) using the PRK and the generated OTK, and store the generated one-time PBK by match the OTK therewith; and a scan code generating unit configured to generate a scan code including the generated one-time PBK.

In another general aspect of the present invention, a user terminal is provided, and the user terminal includes a scan code recognizing unit configured to recognize a scan code including a one-time PBK, acquire the one-time PBK and store the acquired one-time PBK; and an OTK acquiring unit configured to acquire an OTK from the acquired one-time PBK using a PRK, and store the acquired OTK.

In another general aspect of the present invention, a method for processing a one-time scan code is provided, and the method includes generating, at a server apparatus, an OTK having a valid time and storing the generated OTK and valid time information of the OTK; generating, at the server apparatus, a one-time PBK using the generated OTK and a PRK which is shared with a user terminal, and storing the generated one-time PBK by matching the OTK therewith; and generating, at the server apparatus, a scan code including the generated one-time PBK.

Other features and aspects will be apparent from the following detailed description, the drawings, and the claims.

Figure 1:
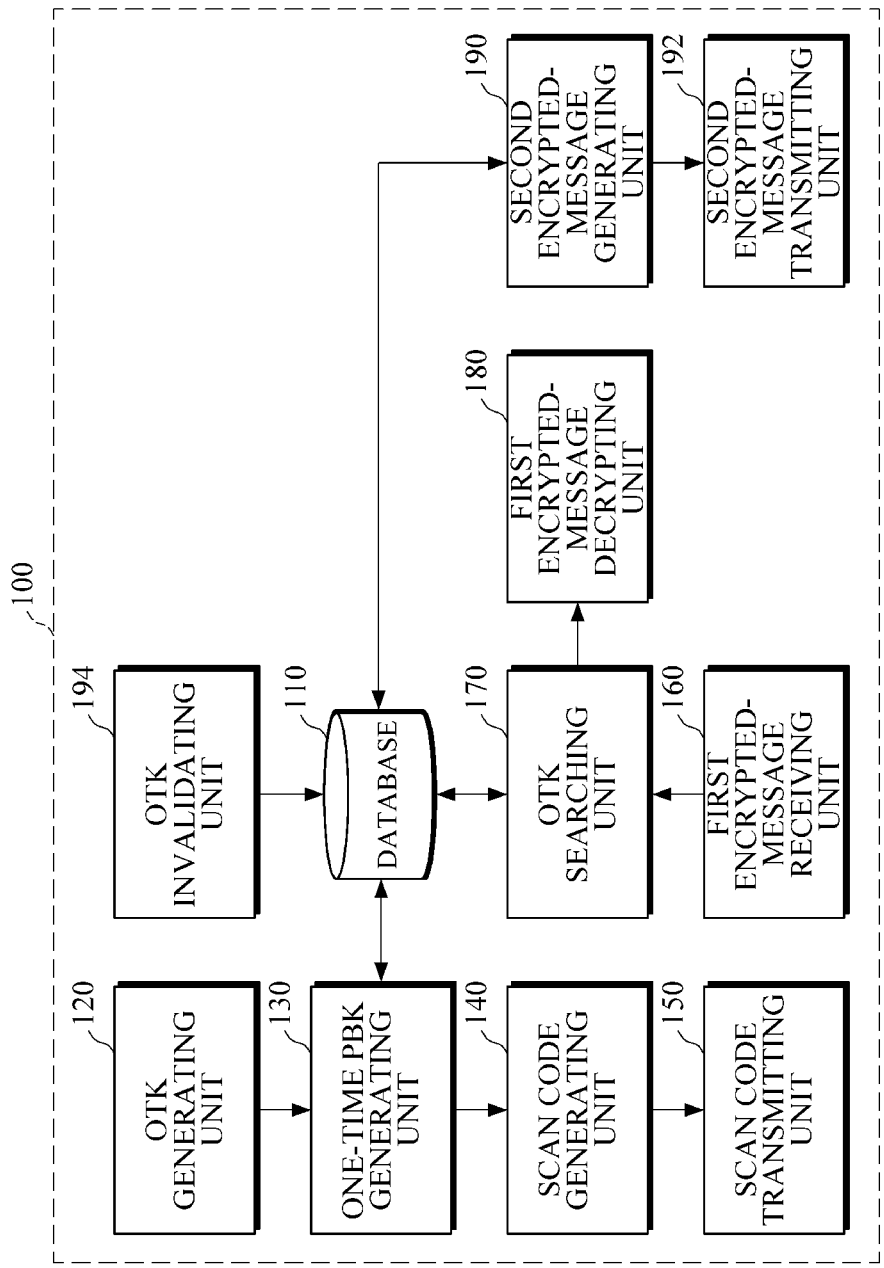
FIG. 1 is a block diagram illustrating an example of a server apparatus having a one-time scan code issuing function according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

FIG. 1 is a block diagram illustrating an example of a server apparatus having a one-time scan code issuing function according to an exemplary embodiment of the present invention. Referring to FIG. 1, a server apparatus 100 according to an exemplary embodiment of the present invention includes database 110, a One Time Key (OTK) generating unit 120, a one-time Public Key (PBK) generating unit 130 and a scan code generating unit 140.

The database 110 stores a Private Key (PRK) of each user. The PRK refers to a previously-stored encryption key that is shared between the user terminal 200 and the server apparatus 100.

The OTK generating unit 120 generates an OTK with a valid time, and stores the generated OTK and valid time information of the OTK in the database 110. A valid time refers to a valid time period during which a corresponding OTK is able to be used, and the OTK is stored with the valid time.

Using the PRK stored in the database 110 and the OTK generated in the OTK generating unit 120, the one-time PBK generating unit 130 generates a one-time PBK. In addition, the one-time PBK generating unit 130 stores the generated one-time PBK in the database 110 by matching the OTK therewith.

For example, the one-time PBK generating unit 130 may generate a one-time PBK using a PRK and an encryption function which requires a one-time PBK as a seed value.

The scan code generating unit 140 generates a scan code including the one-time PBK which is generated in the one-time PBK generating unit 130. A scan code refers to a bar code, a QR code or an image which is made by arranging or combining various visual patterns, shapes and colors. At this time, the scan code including the one-time PBK is transmitted to the user terminal 200 online or off-line and then scanned by the user terminal 200.

According to another exemplary embodiment of the present invention, the server apparatus 100 having a one-time scan code issuing function may further include a scan code transmitting unit 150. The scan code transmitting unit 150 transmits to the user terminal 200 the scan code including the one-time PBK which is generated by the scan code generating unit 140.

The one-time PBK generated by the scan code generating unit 140 is scanned by the user terminal 200, and it is an exemplary case where the scan code including the one-time PBK is transmitted online to the user terminal 200 via the scan code transmitting unit 150.

Meanwhile, according to another exemplary embodiment of the present invention, the server apparatus 100 having a one-time scan code issuing function may further include a first encrypted-message receiving unit 160, an OTK searching unit 170 and a first encrypted-message decrypting unit 180.

The first encrypted-message receiving unit 160 receives a first encrypted-message, which is generated using an OTK, and a one-time PBK from the user terminal 200. Specifically, in response to receiving a scan code including the one-time PBK, the user terminal 200 acquires the one-time PBK from the scan code, and then acquires the OTK from the acquired one-time PBK using a PRK which is shared with the server apparatus 100.

In addition, the user terminal 200 generates a first encrypted-message by encrypting a message using the acquired OTK, and transmits the generated first encrypted-message and the one-time PBK to the sever apparatus 100. In response, the server apparatus 100 receives the first encrypted-message, which is generated using the OTK, and the one-time PBK from the user terminal 200 via the first encrypted-message receiving unit 160.

The OTK searching unit 170 verifies validity of the one-time PBK received from the first encrypted-message receiving unit 160, and, if the validity of the one-time PBK is verified, searches for an OTK matched with the one-time PBK.

For example, since any generated one-time PBK is stored in database 110, it is able to verify validity of the one-time PBK by searching the database 110 for a one-time PBK that is the same as the received one-time PBK.

Meanwhile, as the OTK matched with the one-time PBK is stored in the database 110, it is able to search the database 110 for the OTK matched with the one-time PBK, if validity of the one-time PBK is verified.

Using the OTK found by the OTK searching unit 170, the first encrypted-message decrypting unit 180 decrypts the first encryption message received from the first encrypted-message receiving unit 160.

For example, the first encrypted-message decrypting unit 180 may decrypt the first encrypted-message using a decryption function which requires an OTK as a seed value.

The first encrypted-message received from the first encrypted-message receiving unit 160 is a message which is encrypted in the user terminal 200 using an OTK. Accordingly, the first encrypted-message decrypting unit 180 is able to decrypt the first encrypted-message using an OTK that is the same as the OTK used for the encryption of the first encrypted-message.

Meanwhile, according to another exemplary embodiment of the present invention, the server apparatus 100 having a one-time scan code issuing function may further include a second encrypted-message generating unit 190 and a second encrypted-message transmitting unit 192.

The second encrypted-message generating unit 190 generates a second encrypted-message by encrypting a message using an OTK. For example, the second encrypted-message generating unit 190 may encrypt a message using an encryption function which requires an OTK as a seed value.

The second encrypted-message transmitting unit 192 transmits the second encrypted-message, which is generated in the second encrypted-message generating unit 190, and the one-time PBK to the user terminal 200. In response to receiving the second encrypted-message and the one-time PBK from the server apparatus 100, the user terminal 200 verifies validity of the received one-time PBK, if the validity of the one-time PBK is verified, searches for an OTK matched with the one-time PBK, and decrypts the second encrypted-message using the found OTK.

Meanwhile, according to another exemplary embodiment of the present invention, the server apparatus 100 having a one-time scan code issuing function may further include an OTK invalidating unit 194. The OTK invalidating 194 invalidates an OTK and a one-time PBK in the cases when all messages are completed transmitted or received with respect to the user terminal 200, when valid time of the OTK has expired or when a communication attempt is made using the one-time PBK that is suspected of being forged or counterfeited.

Figure 2:
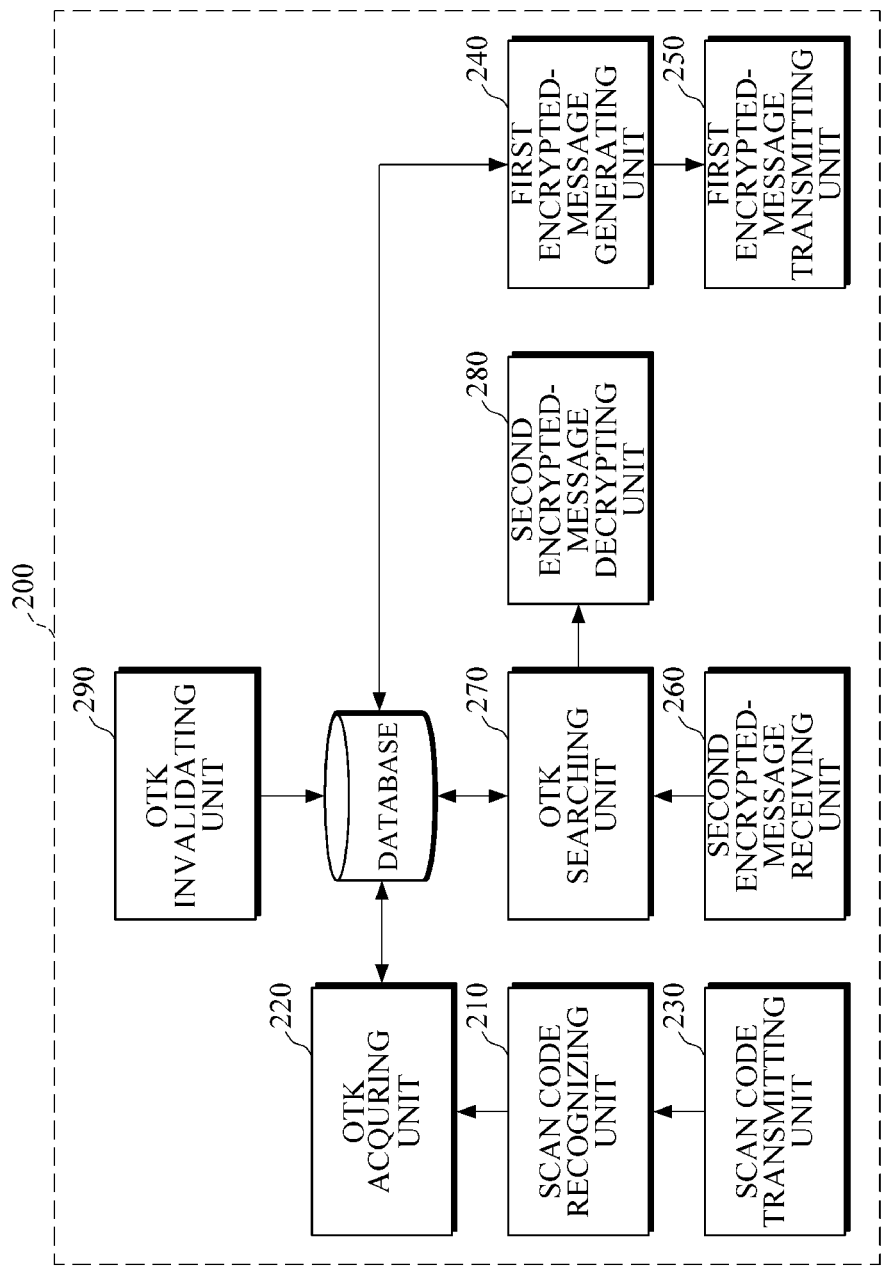
FIG. 2 is a block diagram illustrating an example of a user client having a one-time scan code recognizing function according to an exemplary embodiment of the present invention.

FIG. 2 is a block diagram illustrating a user terminal having a one-time scan code recognizing function according to an exemplary embodiment of the present invention. Referring to FIG. 2, a user terminal 200 having a one-time scan code recognizing function includes a scan code recognizing unit 210 and an OTK acquiring unit 220.

The scan code recognizing unit 210 recognizes a scan code including a one-time PBK, acquires the one-time PBK from the scan code, and stores the acquired one-time PBK in database. At this time, the scan code may be a bar code or a QR code.

Using a PRK which is shared with a server apparatus, the OTK acquiring unit 220 acquires an OTK from the acquired one-time PBK. In addition, the OTK acquiring unit 220 stores the acquired OTK in the database.

For example, using a PRK and a decryption function which requires a one-time PBK as a seed value, the OTK acquiring unit 220 may acquire an OTK. The acquired OTK is used to encrypt or decrypt a message which is transmitted and/or received between the server apparatus 100 and the user terminal 200.

Meanwhile, according to another exemplary embodiment of the present invention, the user terminal 200 having a one-time scan code recognizing function may further include a scan code receiving unit 230. The scan code receiving unit 230 receives a scan code including a one-time PBK from the server apparatus 100.

That is, if the server apparatus 100 transmits the scan code including the one-time PBK online, the user terminal 200 may receive the scan code via the scan code receiving unit 230 online.

Meanwhile, according to another exemplary embodiment of the present invention, the user terminal 200 having a one-time scan code recognizing function may further include a first encrypted-message generating unit 240 and a first encrypted-message transmitting unit 250.

The first encrypted-message generating unit 240 generates a first encrypted-message by encrypting a message using an OTK. For example, the first encrypted-message generating unit 240 may encrypt a message using an encryption function which requires an OTK as a seed value.

The first encrypted-message transmitting unit 250 transmits the first encrypted-message, which is generated in the first encrypted-message generating unit 240, and a one-time PBK to the server apparatus 100. In response to receiving the first encrypted-message and the one-time PBK from the user terminal 200, the server apparatus 100 verifies validity of the received one-time PBK, if the validity of the one-time PBK is verified, searches for an ODK matched with the one-time PBK, and decrypts the first encrypted-message using the found OTK.

Meanwhile, according to another exemplary embodiment of the present invention, the user terminal 200 having a one-time scan code recognizing function includes a second encrypted-message receiving unit 260, an OTK searching unit 270 and a second encrypted-message decrypting unit 280.

The second encrypted-message receiving unit 260 receives a second encrypted-message, which is generated using an OTK, and a one-time PBK from the server apparatus 100. The server apparatus 200 generates the second encrypted-message by encrypting a message using the OTK, and transmits the generated second encrypted-message and the one-time PBK to the user terminal 200. In response, the user terminal 200 receives the second encrypted-message and the one-time PBK from the server apparatus 100 via the second encrypted-message receiving unit 260.

The OTK searching unit 270 verifies validity of the one-time PBK received in the second encrypted-message receiving unit 260, and, if the validity of the one-time PBK is verified, searches for an OTK matched with the one-time PBK.

For example, as the user terminal 200 stores in database the one-time PBK received from the server apparatus 100, it is able to verify the validity of the one-time PBK by searching the database for a one-time PBK which is the same as the received one-time PBK.

Meanwhile, using a PRK which is shared with the server apparatus, the user terminal 200 acquires an OTK from the one-time PBK transmitted from the server apparatus 100. In addition, the user terminal 200 stores the acquired OTK in the database. Accordingly, if the validity of the one-time PBK is verified, it is able to search for the OTK matched with the one-time PBK in the database.

Using the found OTK, the second encrypted-message decrypting unit 280 decrypts the second decrypted-message received by the second encrypted-message receiving unit 260.

For example, the second encrypted-message decrypting unit 280 may decrypt the second encrypted-message using a decryption function which requires an OTK as a seed value.

The second encrypted-message received by the second encrypted-message receiving unit 260 is a message which is encrypted in the server apparatus 100 using an OTK, so the second encrypted-message decrypting unit 280 is able to decrypt the second encrypted-message using an OTK that is the same as the OTK used for the encryption of the second-encrypted-message.

Meanwhile, according to another exemplary embodiment of the present invention, the user terminal 200 having a one-time scan code recognizing function may include an OTK invalidating unit 290. The OTK invalidating unit 290 invalidates an OTK and a one-time PBK in the cases when all messages are completely transmitted and/or received with respected to the server apparatus 100, when a valid time of the OTK has expired or when a communication attempt is made using the one-time PBK that is suspected of being forged or counterfeited.

Figure 3:
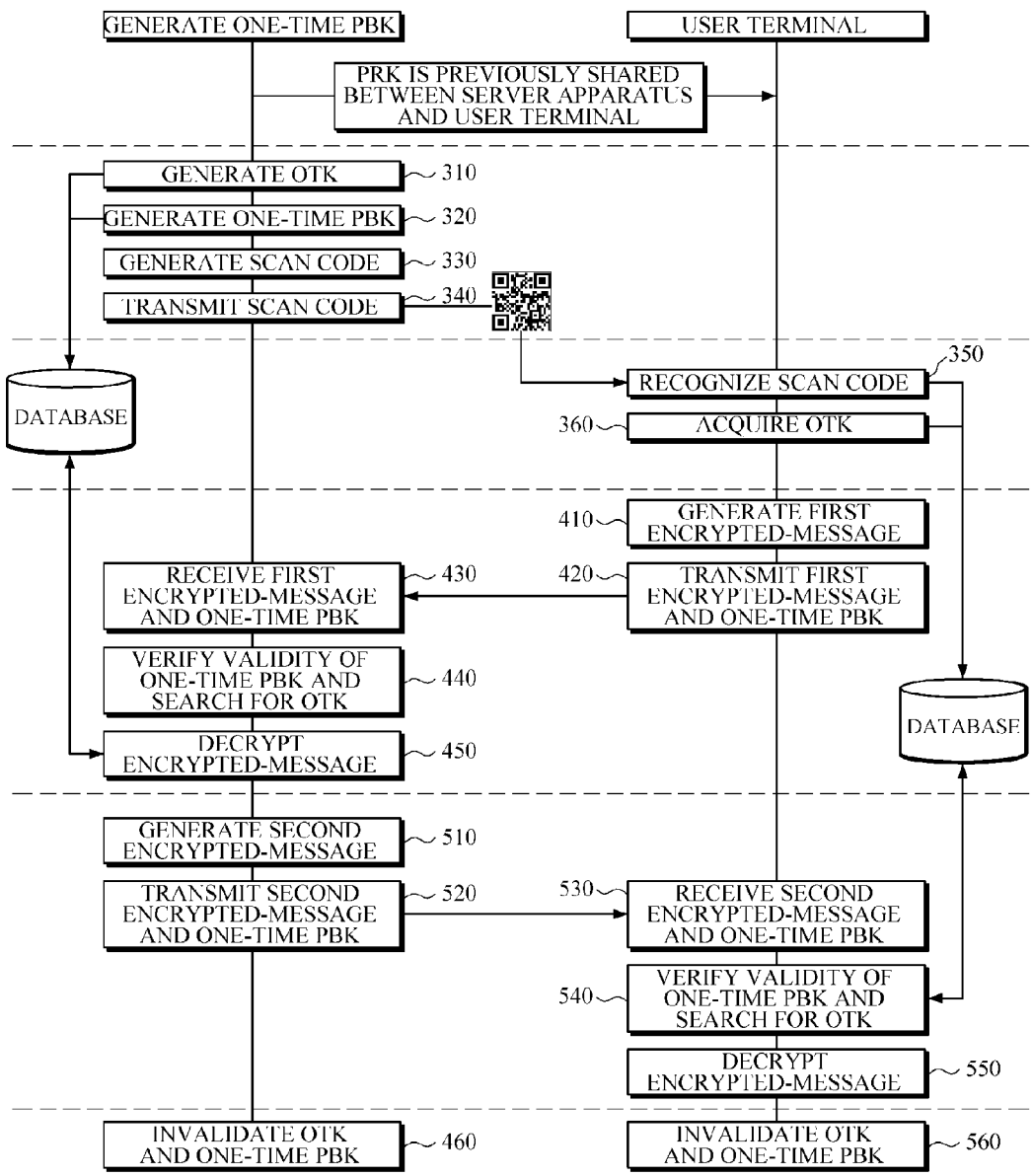
FIG. 3 is a flow chart illustrating an example of a method for processing a one-time scan code according to an exemplary embodiment of the present invention.

FIG. 3 is illustrated to explain a process for transmitting one-time information used for key-exchange-scheme encryption, using a one-time scan code, and transmitting a message between the server apparatus 100 and the user terminal 200 using the one-time information.

FIG. 3 is a flow chart illustrating a method for processing a one-time scan code according to an exemplary embodiment of the present invention. With respect to the method, it is assumed that the server apparatus and the user terminal share a PRK previously.

In operation 310, the server apparatus generates an OTK with a valid time and stores the OTK and valid time information of the OTK. Detailed descriptions about the server apparatus generating an OTK with a valid time are provided in the above, so they will not be explained herein.

Next, in operation 320, the server apparatus generates a one-time PBK using the generated OTK and the previously-stored PRK shared with the user terminal, and store the generated one-time PBK by matching the OTK therewith. Detailed descriptions about the server apparatus generating a one-time PBK using an OTK are provided in the above, so they will not be explained herein.

Next, in operation 330, the server apparatus generates a scan code including the generated one-time PBK. At this time, the scan code may be a bar code or a QR code.

Meanwhile, in operation 340, the server apparatus transmits the scan code including the one-time PBK to the user terminal.

Next, in operation 350, the user terminal recognizes the scan code including the one-time PBK, acquires the one-time PBK from the scan code and stores the acquired one-time PBK.

Nest, in operation 360, the user terminal acquires the OTK from the acquired one-time PBK using the PRK that is shared with the server apparatus, and stores the acquired OTK. Detailed descriptions about the user terminal acquiring an OTK from an acquired one-time PBK using a PRK are provided in the above, so they will not be explained herein.

If the OTK is transmitted from the server apparatus to the user terminal in the above manner, a message transmitted between the server apparatus and the user terminal is encrypted or decrypted using the OTK.

For a starter, in operations 410 and 510, the server apparatus or the user terminal generates an encrypted-message by encrypting a message using the OTK. Detailed description about the server apparatus or the user terminal encrypting a message using an OTK are provided in the above, so they will not be explained herein.

Next, in operations 420 and 520, the server apparatus or the user terminal transmits the encrypted-message, which is generated in operation 410 or 510, and a one-time PBK to the opposite apparatus.

In operations 430 and 530, the opposite apparatus receives the encrypted-message and the one-time PBK from the server apparatus or the user terminal.

Next, in operations 440 and 540, the opposite apparatus verifies validity of the one-time PBK received in operation 430 or 530, and, if the validity of the one-time PBK is verified, searches for the OTK matched with the one-time PBK. Detailed description about verifying the validity of a one-time PBK and searching for an OTK are provided in the above, so they will not be provided herein.

Next, in operations 450 and 550, the opposite apparatus decrypts the encrypted-message using the found OTK. Detailed descriptions about decrypting an encrypted-message are provided in the above, so they will not be provided herein.

Meanwhile, in operations 460 and 560, the server apparatus or the user terminal invalidates the OTK and the one-time PBK in the cases when all messages has been completely transmitted/received with respect to the opposite apparatus, when the validity of the OTK has expired or when a communication attempt is made using the one-time PBK suspected of being forged or counterfeited.

According to the above description, the present invention is able to safely and conveniently transmit one-time information, used for a key-exchange-scheme-based encryption, using a scan code, such as a bar code and a QR code, so that the above-mentioned object of the present invention may be achieved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A server apparatus having a one-time scan code issuing function, the server apparatus comprising:
   a processor and memory;
   a database configured to store a Private Key (PRK) of each user;
   an OTK generating unit configured to generate an One Time Key (OTK) with a valid time, and store the generated OTK and valid time information of the OTK;
   an PBK generating unit configured to generate a one-time Public Key (PBK) using the PRK and the generated OTK, and store the generated one-time PBK by matching the OTK therewith;
   a scan code generating unit configured to generate a scan code comprising the generated one-time PBK;
   a first encrypted-message receiving unit configured to receive a first encrypted-message, which is generated using the OTK by a first encrypted-message generating unit of a user terminal, and the one-time PBK from the user terminal;
   an OTK searching unit configured to verify validity of the received one-time PBK, and, in response to a verified validity of the one-time PBK, search for the OTK matched with the one-time PBK; and
   a first encrypted-message decrypting unit configured to decrypt the received first encrypted-message using the found OTK.

2. The server apparatus of claim 1, further comprising:
   a scan code transmitting unit configured to transmit the scan code comprising the one-time PBK to the user terminal.

3. The server apparatus of claim 1, further comprising:
   a second encrypted-message generating unit configured to generate a second encrypted-message by encrypting a message using the OTK; and
   a second encrypted-message transmitting unit configured to transmit the generated second encrypted-message and the OTK to the user terminal.

4. The server apparatus of claim 3, further comprising:
   an OTK invalidating unit configured to invalidate the OTK and the one-time PBK when all messages are completely transmitted and/or received with respect to the user terminal, when the valid time of the OTK has expired, or when a communication attempt is made using the one-time PBK that is suspected of being forged or counterfeited.

5. The server apparatus of claim 1, wherein the scan code is a bar code or a QR code.

6. A user terminal comprising:
   a processor and memory;
   a scan code recognizing unit configured to recognize a scan code comprising a one-time Public Key (PBK), acquire the one-time PBK from the scan code and store the acquired one-time PBK;
   an OTK acquiring unit configured to acquire an One Time Key (OTK) from the acquired one-time PBK using a Private Key (PRK), and store the acquired OTK;
   a second encryption message receiving unit configured to receive a second encrypted-message, which is generated using the OTK by a second encrypted-message generating unit of a server apparatus, and the one-time PBK from the server apparatus;
   an OTK searching unit configured to verify validity of the received one-time PBK, and, in response to a verified validity of the one-tine PBK, search for the OTK matched with the one-time PBK; and
   a second encrypted-message decrypting unit configured to decrypt the received second encrypted-message using the found OTK.

7. The user terminal of claim 6, further comprising:
   a scan code receiving unit configured to receive the scan code comprising the one-time PBK from the server apparatus.

8. The user terminal of claim 6, further comprising:
   a first encrypted-message generating unit configured to generate a first encrypted-message by encrypting a message using the OTK; and
   a first encrypted-message transmitting unit configured to transmit the generated first encrypted-message and the one-time PBK to the server apparatus.

9. The user terminal of claim 6, further comprising
   an OTK invalidating unit configured to invalidate the OTK and the one-time PBK when all messages are completely transmitted and/or received with respect to the user terminal, when the valid time of the OTK has expired, or when a communication attempt is made using the one-time PBK that is suspected of being forged or counterfeited.

10. The user terminal of claim 6, wherein the scan code is a bar code or a QR code.

11. A method for processing a one-time scan code, the method comprising:

generating, at a server apparatus, an One Time Key (OTK) having a valid time and storing the generated OTK and valid time information of the OTK;

generating, at the server apparatus, a one-time Public Key (PBK) using the generated OTK and a Private Key (PRK) which is shared with a user terminal, and storing the generated one-time PBK by matching the OTK therewith;

generating, at the server apparatus, a scan code comprising the generated one-time PBK;

generating, at the user terminal, generating a first encrypted-message by encrypting a message using the OTK;

transmitting, at the user terminal, the generated first encrypted-message and the one-time PBK to the server apparatus;

receiving, at the server apparatus, the generated first encrypted-message and the one-time PBK from the user terminal;

verifying, at the server apparatus, validity of the received one-time PBK and, in response to a verified validity of the one-time PBK, searching for the OTK matched with the one-time PBK; and decrypting, at the server apparatus, the received first encrypted-message using the found OTK.

12. The method of claim 11, further comprising:
transmitting, at the server apparatus, the generated scan code comprising the one-time PBK to the user terminal.

13. The method of claim 11, further comprising:
recognizing, at the user terminal, the scan code comprising the one-time PBK, acquiring the one-time PBK and storing the acquired one-time PBK; and
acquiring, at the user terminal, the OTK from the acquired one-time PBK and storing the acquired OTK.

14. The method of claim 11, further comprising:
invalidating, at the server apparatus, the OTK and the one-time PBK when all messages are completely transmitted and/or received with respect to the user terminal, when the validity of the OTK has expired or when a communication attempt is made using the one-time PBK that is suspected of being forged or counterfeited.

15. The method of claim 11, wherein the scan code is a bar code or a QR code.

16. A method for processing a one-time scan code, the method comprising:

generating, at a server apparatus, an One Time Key (OTK) having a valid time and storing the generated OTK and valid time information of the OTK;

generating, at the server apparatus, a one-time Public Key (PBK) using the generated OTK and a Private Key (PRK) which is shared with a user terminal, and storing the generated one-time PBK by matching the OTK therewith;

generating, at the server apparatus, a scan code comprising the generated one-time PBK;

generating, at the server apparatus a second encrypted-message by encrypting a message using the OTK;

transmitting, at the server apparatus, the generated second encrypted-message and the one-time PBK to the user terminal;

receiving, at the user terminal, the generated second encrypted-message and the one-time PBK from the server apparatus;

verifying, at the user terminal, validity of the received one-time PBK and, in response to a verified validity of the one-time PBK, searching for the OTK matched with the one-time PBK; and decrypting, at the user terminal, the received second encrypted-message using the found OTK.

17. The method of claim 16, further comprising:
invalidating, at the user terminal, the OTK and the one-time PBK when all messages are completely transmitted and/or received with respect to the server apparatus, when the validity of the OTK has expired or when a communication attempt is made using the one-time PBK that is suspected of being forged or counterfeited.

18. The method of claim 16, further comprising:
transmitting, at the server apparatus, the generated scan code comprising the one-time PBK to the user terminal.

19. The method of claim 16, further comprising:
recognizing, at the user terminal, the scan code comprising the one-time PBK, acquiring the one-time PBK and storing the acquired one-time PBK; and
acquiring, at the user terminal, the OTK from the acquired one-time PBK and storing the acquired OTK.

20. The method of claim 16, wherein the scan code is a bar code or a QR code.

* * * * *